No. 761,403.

Patented May 31, 1904.

UNITED STATES PATENT OFFICE.

ALBERT H. ROBINETTE, OF FOSTORIA, OHIO.

GUNPOWDER.

SPECIFICATION forming part of Letters Patent No. 761,403, dated May 31, 1904.

Application filed January 30, 1904. Serial No. 191,366. (No specimens.)

*To all whom it may concern:*

Be it known that I, ALBERT H. ROBINETTE, a citizen of the United States, residing at Fostoria, in the county of Seneca and State of Ohio, have invented new and useful Improvements in Gunpowder, of which the following is a specification.

This invention relates to gunpowder, and has for its object to produce an improved explosive compound of that kind characterized by novel mixture of ingredients to produce advantageous results.

The powder consists of the following ingredients compounded in the proportions stated: nitrate of potash, twenty parts; dried ferrocyanid of potash, twenty parts; chlorate of potash, thirty parts; yellow prussiate of potash, ten parts; sugar, granulated, twenty parts.

In the preparation of this compound enough water is added to the sugar to boil the same, and it is boiled until a few drops dropped in cold water will harden. The other ingredients are then added and the mixture stirred until it begins to crumble. It is then granulated into fine grains in the usual manner. The ingredients should be finely powdered before being mixed and incorporated. The powder produced is a blue or white powder of great power, and it may be fired by any ordinary percussion-cap. The nitrate of potash prevents the fouling or rusting of the gun-barrels and with the aid of the ferrocyanid forms a quick and easy blaze, sufficient to ignite the more powerful chlorate of potash. The yellow prussiate acts as a purifier and drier, while the sugar supplies the adhesive and carbon.

What I claim as new, and desire to secure by Letters Patent, is—

An explosive powder consisting of nitrate of potash, ferrocyanid of potash, chlorate of potash, yellow prussiate of potash and granulated sugar, in the proportions substantially as specified.

In testimony whereof I have signed my name to this specification in the presence of two subscribing witnesses.

ALBERT H. ROBINETTE.

Witnesses:
 EDWARD WOLFELT,
 MARTIN ADAMS.